United States Patent [19]

Sakaguchi

[11] Patent Number: 5,285,985
[45] Date of Patent: Feb. 15, 1994

[54] TWO-BEARING REEL

[75] Inventor: Noboru Sakaguchi, tondabayashi, Japan

[73] Assignee: Shimano Inc., Osaka, Japan

[21] Appl. No.: 709,997

[22] Filed: Jun. 4, 1991

[30] Foreign Application Priority Data

Jun. 21, 1990 [JP] Japan .................. 2-65631[U]

[51] Int. Cl.⁵ ............................................ A01K 89/033
[52] U.S. Cl. ..................................... 242/302; 242/299
[58] Field of Search ............ 242/257, 279, 298, 299, 242/302

[56] References Cited

U.S. PATENT DOCUMENTS

| 724,208 | 3/1903 | Rockwell | 242/257 X |
| 2,271,883 | 2/1942 | Bannister | 242/257 X |
| 2,380,670 | 7/1945 | Nelson | 242/279 X |
| 3,146,966 | 9/1964 | Dunn | 242/298 X |
| 3,499,609 | 3/1970 | Policansky | 242/298 X |
| 3,612,437 | 10/1971 | Allebach | 242/279 X |
| 5,020,738 | 6/1991 | Yamaguchi | 242/298 |

FOREIGN PATENT DOCUMENTS 46-21126 6/1971 Japan .

Primary Examiner—John M. Jillions
Assistant Examiner—Michael R. Mansen
Attorney, Agent, or Firm—Dickstein, Shapiro & Morin

[57] ABSTRACT

A two-bearing reel comprising a handle for rotating a fishing line takeup spool, a handle shaft connected to the handle, and a rotary transmission member for transmitting drive from the handle shaft to the spool. A one-way clutch acts on the rotary transmission member for preventing rotation of the spool in a direction to feed out the fishing line. The one-way clutch includes a rod supported to be slidable but unrotatable relative to an outer wall of the reel, rollers contacting a tapered surface defined on an inward end of the rod, and a coil spring for inwardly urging the rod.

3 Claims, 5 Drawing Sheets

TWO-BEARING REEL

BACKGROUND OF THE INVENTION

1. FIELD OF THE INVENTION

This invention relates to two-bearing reels, and more particularly to a technique of placing a one-way clutch in position for preventing a spool from rotating in a direction to feed out a fishing line.

2. DESCRIPTION OF THE RELATED ART

In a known two-bearing reel, a ratchet type one-way clutch, for example, is provided for a line takeup handle. This one-way clutch prevents rotation of a spool when torque is applied to the spool in a direction to feed out a fishing line.

The two-bearing reel including a one-way clutch for the handle shaft as noted above is often constructed to include also an output gear for transmitting drive to a level wind mechanism or a drag mechanism mounted on the handle shaft. Consequently, the handle shaft tends to have an extended length for carrying the one-way clutch as well, which results in a large overall construction of the reel.

SUMMARY OF THE INVENTION

An object of the present invention is to provide a two-bearing reel in which a one-way clutch is positioned in a rational way to avoid enlargement of the reel construction.

The above object is fulfilled, according to the present invention, by a two-bearing reel comprising a rotary transmission member operatively connected to a handle shaft connected to a handle, and a one-way clutch for preventing rotation of the rotary transmission member in a direction to feed out a fishing line.

With this construction, as shown in FIG. 1 for example, the handle shaft 9 need not have a size to include the one-way clutch E. When a torque acts on the spool 2 in a direction to feed out a fishing line, the one-way clutch E prevents rotation of the spool 2.

In the prior art, the handle shaft 9 must have an extended length to support many components including a drag mechanism B. The present invention effectively reduces the length of the handle shaft 9 compared with the known construction since the one-way clutch E is now contained in an appropriate free space.

Other features and advantages of the present invention will be apparent from the following description made with reference to the accompanying drawings.

DETAILED DESCRIPTION OF THE PREFERRED EMBODIMENTS

Two-bearing reels according to the present invention will be described in detail with reference to the drawings.

Figure 1:
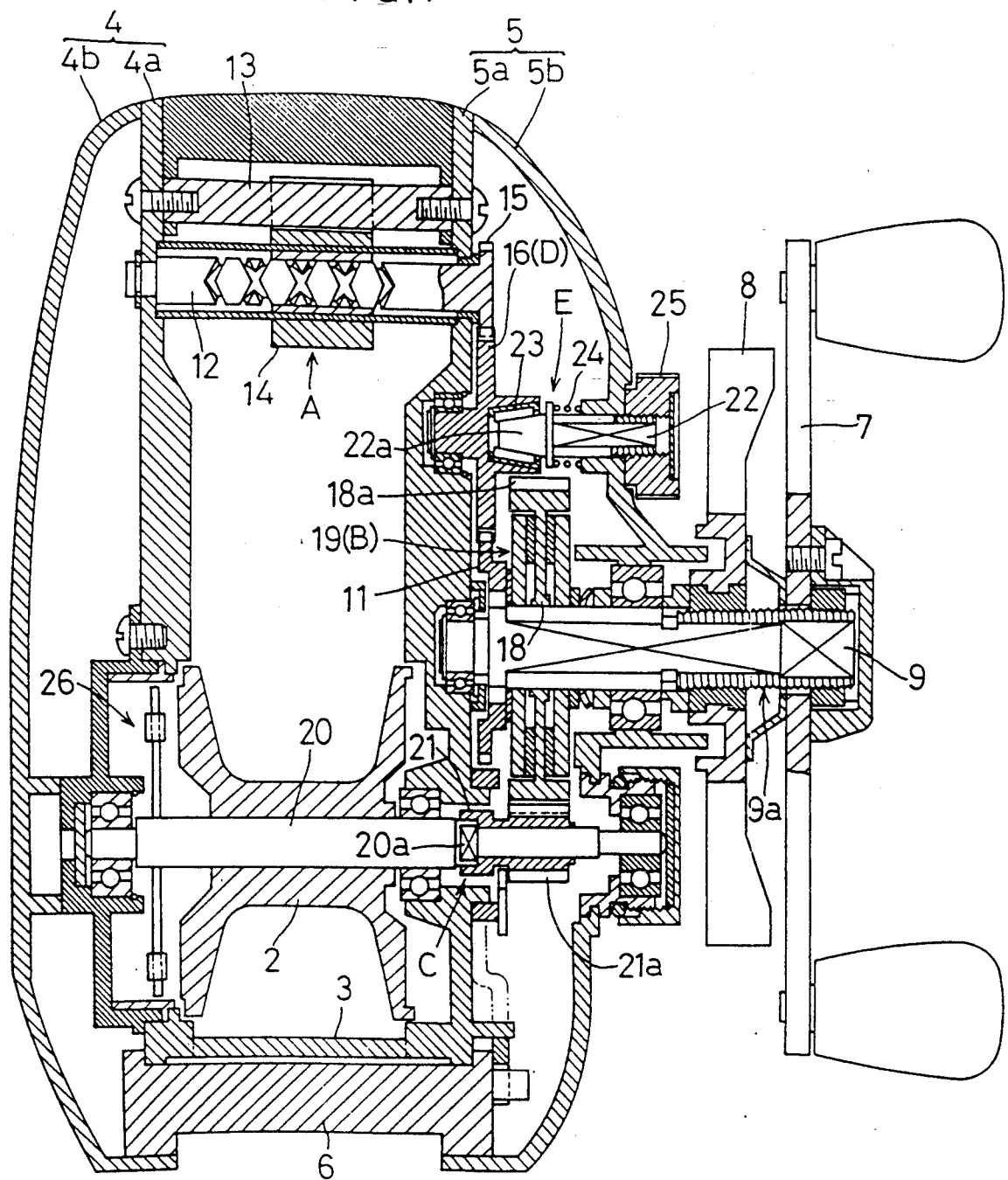
FIG. 1 is a view in cross section of a two-bearing reel according to the present invention.

As shown in FIG. 1, a two-bearing reel comprises a level wind mechanism A, a spool 2 and a thumb rest 3 disposed between left and right side cases 4 and 5 and arranged in the stated order from front to back with respect to a fishing rod (not shown) to which the reel is attached in use. A push knob 6 is disposed rearwardly of the thumb rest 3, which may be pressed downwardly to place the spool 2 in a free rotation state. A line takeup handle 7 and a star-shaped drag adjuster 8 are disposed laterally outwardly of the right side case 5.

Each of the left and right side cases 4 and 5 includes a side plate 4a or 5a, and an outer wall 4b or 5b covering an outward face of the side plate 4a or 5a. The right side plate 5a and outer wall 5b define a space therebetween through which extends a handle shaft 9 connected to the handle 7.

The handle shaft 9 defines a threaded portion 9a with which the drag adjuster 8 is meshed. The handle shaft 9 further carries a drag mechanism B and an interlocking gear 11 on inward positions thereof.

The level wind mechanism A includes a line guide 14 reciprocable along a guide rod 13 with rotation of a screw shaft 12. The screw shaft 12 includes a gear 15 formed on one end thereof for receiving drive from the interlocking gear 11 through an intermediate gear 16, and thus these gears constitute a transmission line.

Further, the handle shaft 9 supports a free rotation disk 18 defining an output gear 18a peripherally thereof. The drag mechanism B includes friction plates 19 mounted for torque transmission on the handle shaft 9 and arranged to sandwich the free rotation disk 18 therebetween. The frictional force of the drag mechanism B is adjustable through adjustment of its pressing force effected by turning the drag adjuster 8.

The spool 2 has a spool shaft 20 rotatable with the spool 2, the spool shaft 20 including an engaging portion 20a in an intermediate position thereof. The spool shaft 20 carries a slide element 21 freely rotatably mounted thereof and engageable with the engaging portion 20a. The slide element 21 defines an input gear 21a meshed with the output gear 18a of the free rotation disk 18. When the handle 7 is turned with the slide element 21 engaging the engaging portion 20a, the spool 2 is rotated to take up the fishing line thereon.

The slide element 21 and engaging portion 20a constitute a clutch mechanism C. For feeding out the fishing line, the push knob 6 is operated to set the slide element 21 to a non-engaging position, namely disengage the clutch mechanism C. When the angler swings the fishing rod, the spool 2 is rotated by tension of the fishing line, thereby unwinding the line.

The intermediate gear 16 is one example of rotary transmission members D according to the present invention. The reel in this embodiment includes a one-way clutch E for preventing rotation of the intermediate gear 16 in a direction to feed out the fishing line.

Figure 2:
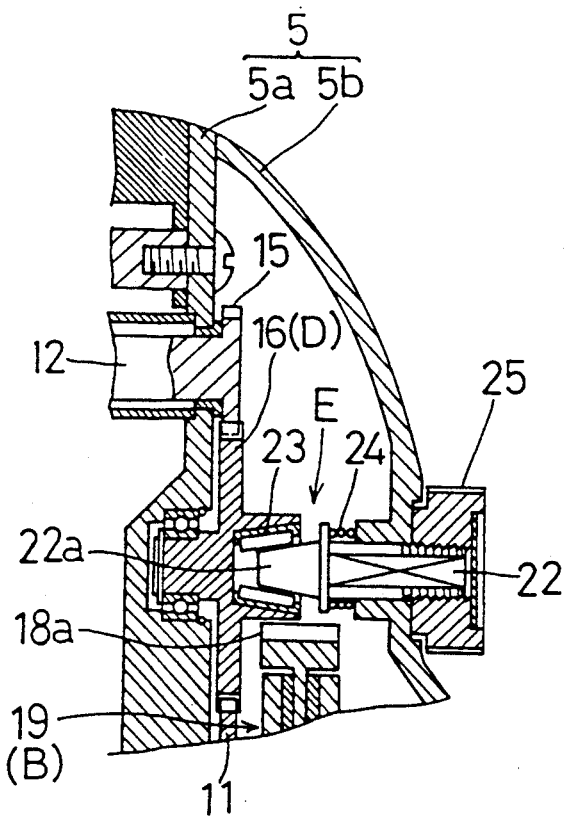
FIG. 2 is a fragmentary sectional view of the reel with a one-way clutch disengaged.

The one-way clutch E is a roller type clutch as disclosed in Japanese Patent Publication No. 1971-21126 or Japanese Utility Model Publication 1967-7523. In the reel according to the present invention, the one-way clutch E includes a rod 22 supported to be slidable but not rotatable relative to the outer wall 5b, rollers 23 contacting a tapered surface 22a of an inward end of the rod 22, and a coil spring 24 for inwardly urging the rod 22. The one-way clutch E having this construction is operable to lock the spool 2 against rotation in the line feed-out direction. The rod 22 carries a control element 25 mounted on an outward end thereof for shifting the rod 22 outwardly against the force of the coil spring 24. When the rod 22 is shifted outwardly as shown in FIG. 2, the tapered surface 22a of the rod 22 is separated from the rollers 23. As a result, the one-way clutch E is disengaged to allow free rotation of the spool 2.

As seen from FIG. 1, the spool shaft 2 carries a centrifugal brake 26 on one end thereof.

Figure 3:
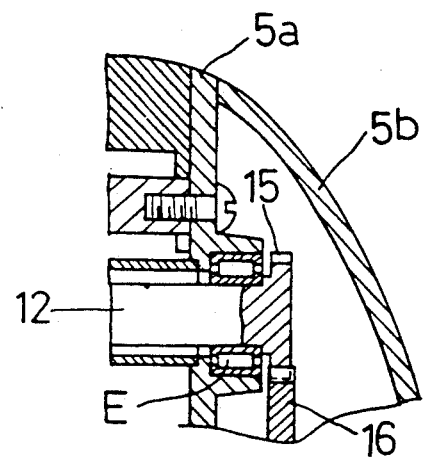
FIG. 3 is a fragmentary sectional view of a two-bearing reel in another embodiment of the invention, with a one-way clutch mounted on an end of a screw shaft.

FIG. 3 shows the same roller type one-way clutch E as in the preceding embodiment, which, however, is disposed in a different position. In this embodiment, the one-way clutch E is disposed between an end of the screw shaft 12 (which is one example of rotary transmission members D) of the level wind mechanism A and the side plate 5a.

Figure 4:
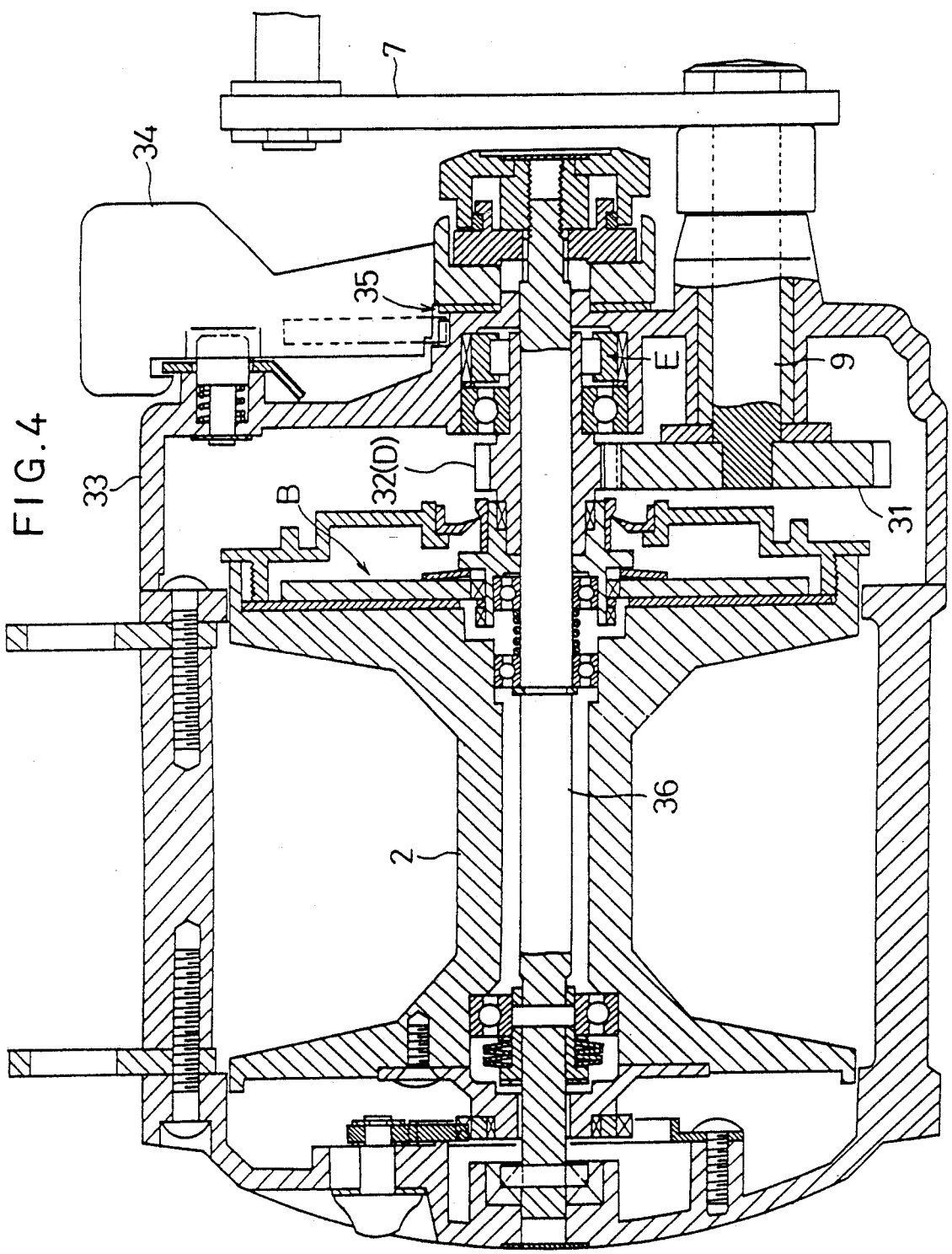
FIG. 4 is a sectional view of a two-bearing reel in a further embodiment, in which a one-way clutch is provided for a pinion gear.

FIG. 4 shows another embodiment which includes a transmission line for transmitting drive from an output gear 31 on a handle shaft 9 connected to a handle 7 to a lateral face of a spool 2 through a pinion gear 32 and a drag mechanism B. For adjusting the frictional force of the drag mechanism B, a lever 34 supported by a reel body 33 is turned to impart a force through a cam mechanism 35 to a spool shaft 36 to move the spool 2 into pressure contact with the drag mechanism B. This reel includes a roller type one-way clutch E disposed between the pinion gear 32 acting as a rotary transmission member D and the reel body 33.

Figure 5:
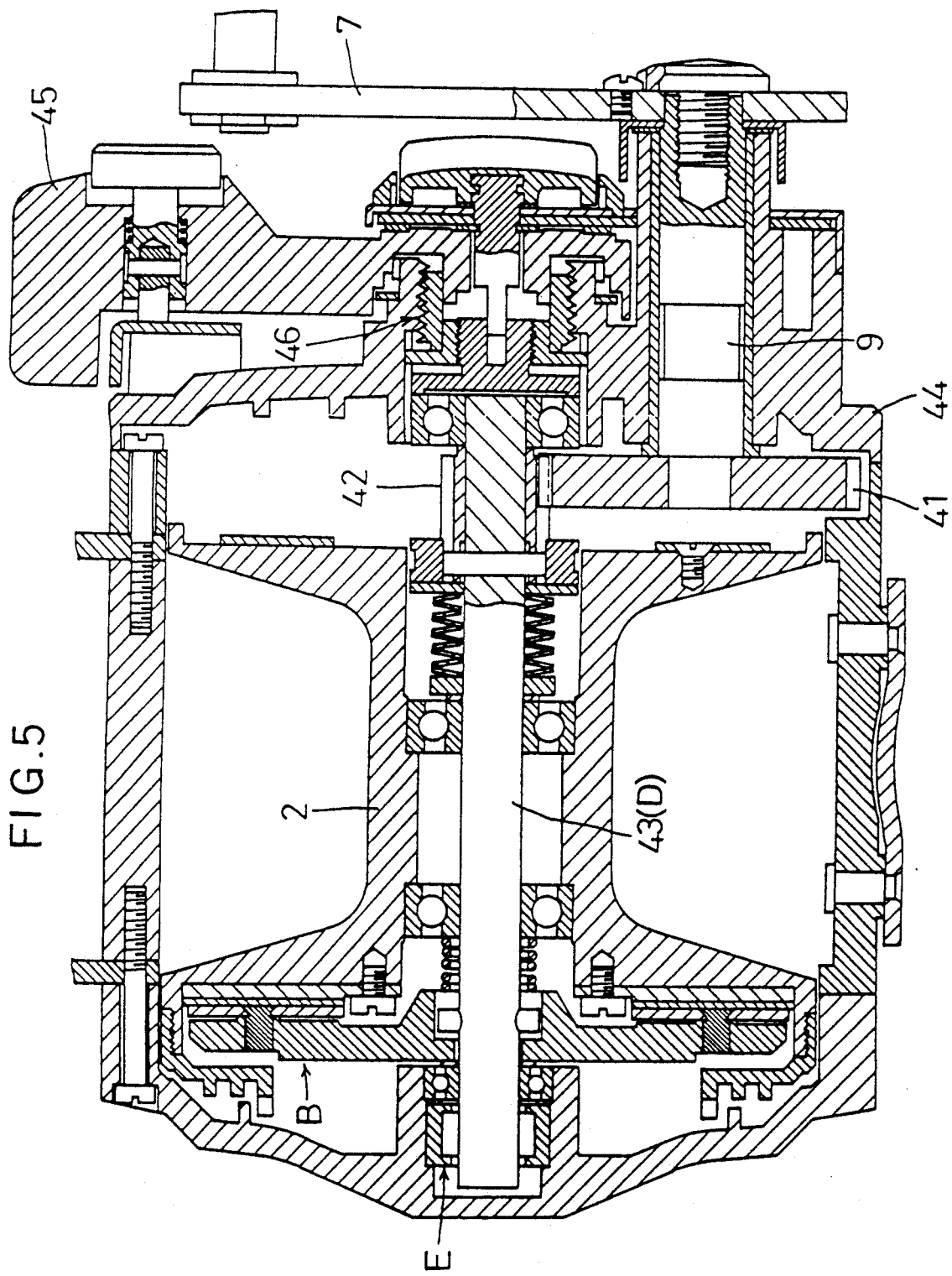
FIG. 5 is a sectional view of a two-bearing reel in a still further embodiment, in which a one-way clutch is provided for a spool shaft.
Figure 6:
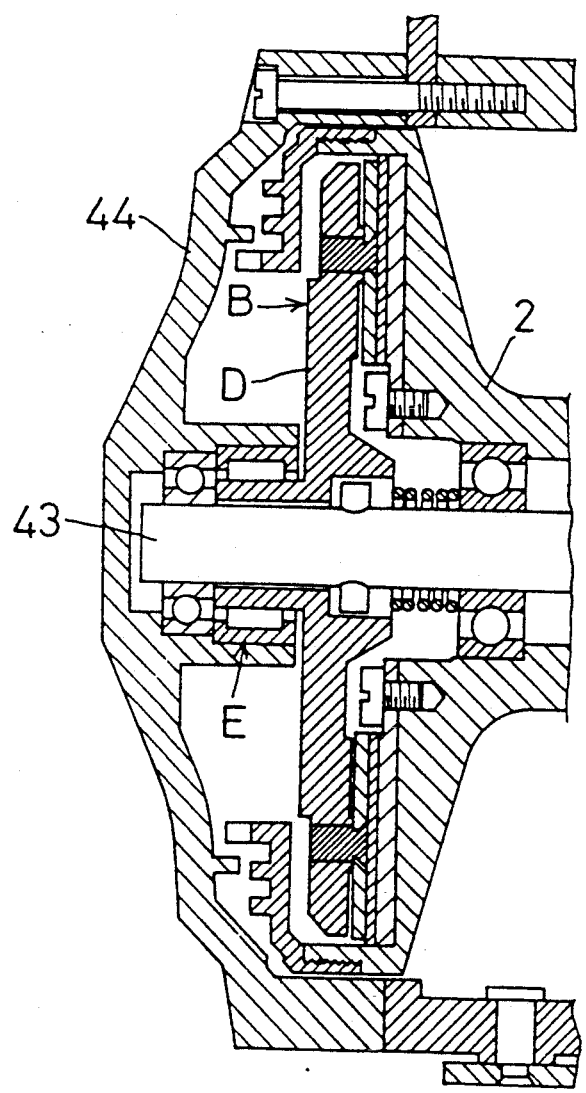
FIG. 6 is a fragmentary sectional view of a two-bearing reel in a still further embodiment, in which a one-way clutch is provided for a drag mechanism.

In FIGS. 5 and 6, a transmission line transmits drive from an output gear 41 on a handle shaft 9 connected to a handle 7 to a lateral face of a spool 2 remote from the handle 7, through a pinion gear 42 and a drag mechanism B. For adjusting the drag mechanism B, a lever 45 supported by a reel body 44 is turned to impart a force through a screw mechanism 46 to a spool shaft 43 to move the spool 2 into pressure contact with the drag mechanism B. In FIG. 5, a one-way clutch E is disposed between an end remote from the handle 7 of the spool shaft 43 acting as a rotary transmission member D and the reel body 44. In FIG. 6, a one-way clutch E is disposed between an end remote from the handle 7 of the drag mechanism B acting as a rotary transmission member D and the reel body 44.

The one-way clutch E in this invention may comprise a ball type clutch instead of the roller type. Further, the one-way clutch E may be provided on any component acting as a rotary transmission member receiving the drive from the handle shaft.

What is claimed is:

1. A two-bearing reel comprising:
   a side case including a side plate and an outer wall;
   a handle for taking up a fishing line;
   a handle shaft connected to said handle, and a gear fitted on said handle shaft;
   a rotary transmission member rotatably supported to said side plate, said rotary transmission member being engaged with said gear, said transmission member having an axis of rotation; and
   a one-way clutch mechanism for preventing rotation of said transmission member in a direction to feed out the fishing line, said one-way clutch mechanism including:
   (a) a plurality of rollers attached to said rotary transmission member;
   (b) a rod supported to said outer wall and having a tapered end surface for applying a frictional force to said rollers, said rod having an axis, said rod being non-rotatable relative to said outer wall, and said rod being axially movable relative to said outer wall;
   (c) an elastic member for urging said rod toward said rotary transmission member; and
   (d) a control element for moving said rod away from said rotary transmission member; and
   wherein the axis of said rod is substantially aligned with the axis of rotation of said rotary transmission member; and
   wherein said rollers are peripherally disposed around the axis of said rod.

2. A two-bearing reel as claimed in claim 1, wherein said control element, said elastic member, and said rod are cooperatively arranged for adjusting the frictional force applied to said rollers.

3. A two-bearing reel as claimed in claim 1, wherein said control element includes means for selectively disengaging said one-way clutch mechanism.

* * * * *